(12) United States Patent
Bonnet (10) Patent No.: US 6,276,508 B1
(45) Date of Patent: Aug. 21, 2001

(54) CHUTE HAVING SORTATION FEATURES

(75) Inventor: Henri Bonnet, Atlanta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 0 days.

(21) Appl. No.: 09/469,098

(22) Filed: Dec. 21, 1999

(51) Int. Cl.$^7$ .......................... B65G 47/10; B65G 47/46; B65G 37/00
(52) U.S. Cl. ........................ 198/348; 198/371; 198/371.3
(58) Field of Search ..................... 198/348, 359, 198/360, 361, 371, 371.3, 787

(56) References Cited

U.S. PATENT DOCUMENTS

| | | |
|---|---|---|
| Re. 15,626 * | 6/1923 | Plonka ........................ 198/371.3 X |
| 2,473,868 | 6/1949 | Domke . |
| 2,572,276 | 10/1951 | Moe . |
| 3,100,039 | 8/1963 | Oderman et al. . |
| 3,171,528 | 3/1965 | Andersen . |
| 3,456,773 | 7/1969 | Titmas, Jr. . |
| 3,552,541 | 1/1971 | Riggs . |
| 3,567,002 | 3/1971 | Russ . |
| 3,737,736 * | 7/1973 | Kornylak ...................... 198/371.3 X |
| 3,804,230 | 4/1974 | Krivec . |
| 4,081,078 | 3/1978 | Richardson et al. . |
| 4,811,830 | 3/1989 | Felder . |
| 4,821,865 * | 4/1989 | Hirata et al. ...................... 198/368 X |
| 5,586,639 | 12/1996 | Yoshino . |
| 5,703,784 * | 12/1997 | Pearson ........................... 209/581 X |
| 5,735,388 | 4/1998 | Brouwer . |
| 5,967,290 | 10/1999 | Bonnet . |
| 6,076,653 | 6/2000 | Bonnet . |

* cited by examiner

Primary Examiner—Christopher P. Ellis
Assistant Examiner—Gene O. Crawford
(74) Attorney, Agent, or Firm—Alston & Bird LLP (57) ABSTRACT

A conveyor sortation station including a plurality of inclined splined rollers which form a slider bed. The plurality of splined rollers are aligned with coparallel axes and allow a parcel or other article to slide downwardly thereon under the influence of gravity to a center discharge destination. If desired, the splined rollers may be commonly rotated in either rotational direction to allow for discharge to side discharge locations on either side of the central discharge location.

20 Claims, 7 Drawing Sheets

FIG. 7.
SYNCRONIZED

CHUTE HAVING SORTATION FEATURES

TECHNICAL FIELD

The present invention relates generally to conveyors, and more particularly relates to a sortation chute assembly for use within a conveying environment.

BACKGROUND OF THE INVENTION

Sortation systems for use within conveying systems are well known. Such sortation systems can accept parcels, packages, or other articles from one or more input sources, and can discharge the items a plurality of output locations, where they can be stored (such as in storage bins) or they can be conveyed to remote locations.

U.S. Pat. No. 3,552,541 to Riggs discloses an article handling apparatus for diverting articles to one or more branch conveyors. The articles are first discharged from a conventional conveyor which may be inclined or declined. The apparatus includes a plurality of elongated driven carrier rollers arranged in a manner perpendicular to the direction of travel. On some of the carrier rollers are a plurality of supplemental rollers which determine the article's direction of travel. The angular orientation of the supplemental rollers with respect to the axis of rotation of the carrier rollers may be altered to correspond with the desired direction of the article. The axis of one group of support rollers corresponds with the axis of the elongated rollers. However, not all are precisely parallel to the carrier rollers. A second group of supplemental rollers on the carrier rollers is aligned so that articles are diverted onto one branch conveyor and another group of supplemental rollers are aligned so that articles are diverted onto the other branch. Gravity, together with the direction of the rotation of the supplemental rollers upon which the article rests, will cause the article to be diverted to one side or the other.

U.S. Pat. No. 5,735,388 to Brouwer discloses a conveyor system for diverting articles from one conveyor to another. The system includes a plurality of rollers with friction-enhancing surfaces. The rollers are mounted on a pivoting axis which may pivot between nondiverted and diverted positions. FIG. 1 illustrates two rows of rollers in the nondiverted position allowing articles to pass without being diverted to the other conveyor. FIG. 2, on the other hand, illustrates the two rows of rollers pivoted into the diverted position to urge articles towards the other conveyor.

U.S. Pat. No. 3,100,039 to Oderman et al. discloses a turning apparatus for a conveyor system. The turning apparatus is located at the junction of four conveyors. The turning apparatus includes a turntable with driving rollers that project upward above the surface of the turntable. Articles are delivered to the turning apparatus where their orientation and direction of travel are changed. The turntable alters the article's orientation and the driving rollers pull articles onto the turning apparatus and then push them on to the appropriate conveyor.

U.S. Pat. No. 3,456,773 to Titmas, Jr. discloses a system for diverting selected articles from a main conveyor onto spur conveyors while maintaining the relative positions of articles with respect to the direction of travel of the articles. Once an article has been selected for being directed onto a spur conveyor, a plurality of diverter rollers 34 mounted between chains 32 of the main conveyor engage the leading edge of the article and turn the article onto rollers 36 of the spur conveyors.

U.S. Pat. No. 3,567,002 to Russ discloses a load transfer device for conveyors. The transfer device includes a pair of independently rotatable turntables mounted at the junction of a main roller conveyor and a side roller conveyor. Each of the turntables include a set of rollers. The turntables are rotatable so that articles may be directed from the main roller conveyor onto the side roller conveyor and vice-versa.

U.S. Pat. No. 4,081,078 to Richardson et al. discloses an article-sorting apparatus. The sorting apparatus includes a main conveyor and at least one subsidiary conveyor angled away from the main conveyor. The articles are sorted between the main and subsidiary conveyors based upon lateral or longitudinal dimensions of the articles. The main conveyor includes a bed of driven angled rollers adapted to apply a lateral force to urge selected articles to the subsidiary conveyor.

U.S. Pat. No. 4,811,830 to Felder discloses a sorting system for piece goods. The system includes a main conveyor, a sorting station, and a delivery conveyor which are interconnected with the intermediate tracks. The intermediate tracks are constructed as gravity roller tracks with freely rotating rollers.

Although the above conveying and/or sortation configurations include advantages, there is always a need in the art for improvements.

SUMMARY OF THE INVENTION

The present invention overcomes deficiencies in the art by providing an improved conveying apparatus.

Generally described, the present invention relates to a conveying system sortation apparatus for accepting articles from at least one source and distributing the articles to one of a plurality of output locations along either a neutral conveying path or a side discharge path, the conveying system comprising an inclined conveyor having an upper end and a lower end, the inclined conveyor comprised of a plurality of inclined splined rollers, each of the splined rollers having longitudinal axes substantially parallel to the neutral conveyor path, and a device for selectively rotating the inclined splined rollers so they can either allow the article to slide down the splines of the inclined splined rollers along the neutral conveyor path to the lower end, or alternately to be ejected to one side of the path along the side discharge path.

Therefore it is an object of the present invention to provide an improved conveying method and apparatus.

It is a further object of the present invention to provide an improved conveying method.

It is a further object of the present invention to provide an improved conveying apparatus which is simple to operate.

It is a further object of the present invention to provide an improved conveying apparatus which is simple to manufacture.

It is a further object of the present invention to provide an improved conveying apparatus which can be readily repaired with a minimum of downtime.

It is a further object of the present invention to provide an improved conveying apparatus which is effective in providing a discharge function.

Other objects, features, and advantages of the present invention will become apparent upon reading the following detailed description of the preferred embodiment of the invention when taken in conjunction with the drawing and the appended claims.

DETAILED DESCRIPTION OF THE PREFERRED EMBODIMENT

Reference is now made to the figures, in which like numerals indicate like elements throughout the several views.

General Construction and Operation

Generally described, the present invention comprises a live gravity chute apparatus for sorting parcels (a.k.a. "package") or other articles from a main feed conveyor down onto one of three receiving stations. Each of the three receiving stations is associated with a different destination. An inclined bed of powered rollers extends from the main feed conveyor towards the center receiving station, with the rollers being parallel and inclined from one end to the other. The rollers rotate about an inclined axis which is parallel to the conveying direction as the parcels.

When a parcel contacts the rollers, the parcel slides down the top of the rollers. If the rollers are rotated, it is compelled to the left or right to one of the outer receiving stations.

The direction of rotation of the rollers determines which of the outer receiving stations receives the parcel. Heavier parcels may require higher RPMs to be compelled to the left or right. The length of the bed of rollers can also be varied depending on the size and weight of the parcels being sorted. As noted above, when the rollers are not operating, the parcel proceeds down the inclined bed of rollers directly to the center receiving station, which in the embodiment shown is a conveyor.

In an alternate embodiment, the top end of the bed of rollers pivots at its upstream end to the left and right. By pivoting the bed of rollers, parcels may be discharged farther to the left or right onto one of two additional chutes positioned outside the three initial chutes.

Additional Details

Figure 1:
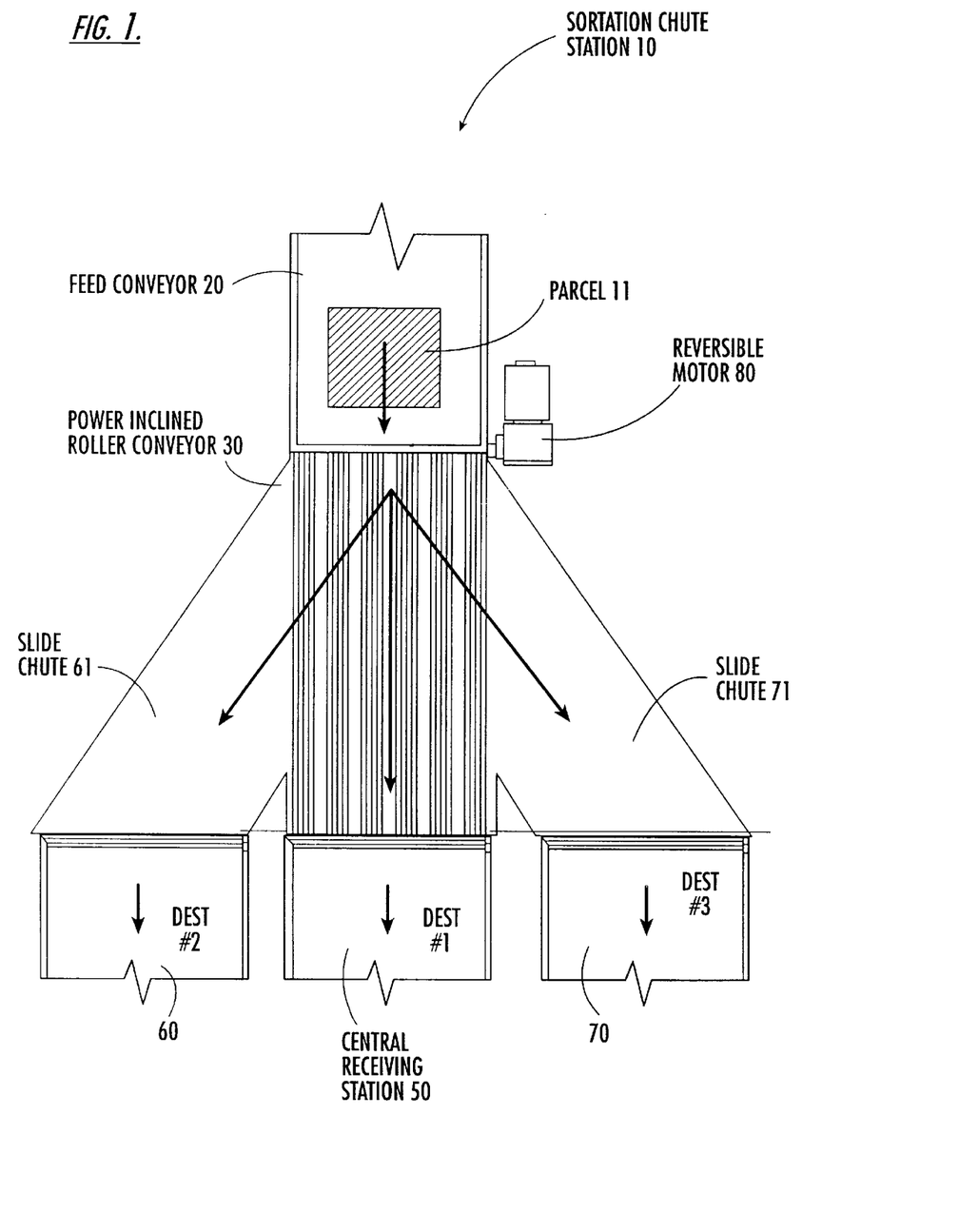
FIG. 1 is a top plan view of a sortation chute assembly 10 according to the present invention.

Reference is now made to FIG. 1, which is a top plan view of a portion of a sortation station 10 according to the present invention. This station 10 includes the following:

feed conveyor 20
powered inclined roller conveyor 30
center receiving station 50
first adjacent side receiving station 60
first slide chute 61
second adjacent side receiving station 70
second slide chute 71
reversible drive motor 80
drive assembly 90

The Infeed Conveyor

The infeed conveyor 20 can be a belt conveyor, or can be of an alternate configuration as desired.

The Inclined Roller Conveyor

The powered inclined roller conveyor assembly 30 includes the following:

base frame 31
plurality of splined rollers 32
splined roller drive pulleys 33

The base frame 31 is conventional in that it substantially stationary and provides a frame to which other elements, such as the rollers 32 an the drive pulleys 33, can be mounted.

Figure 4:
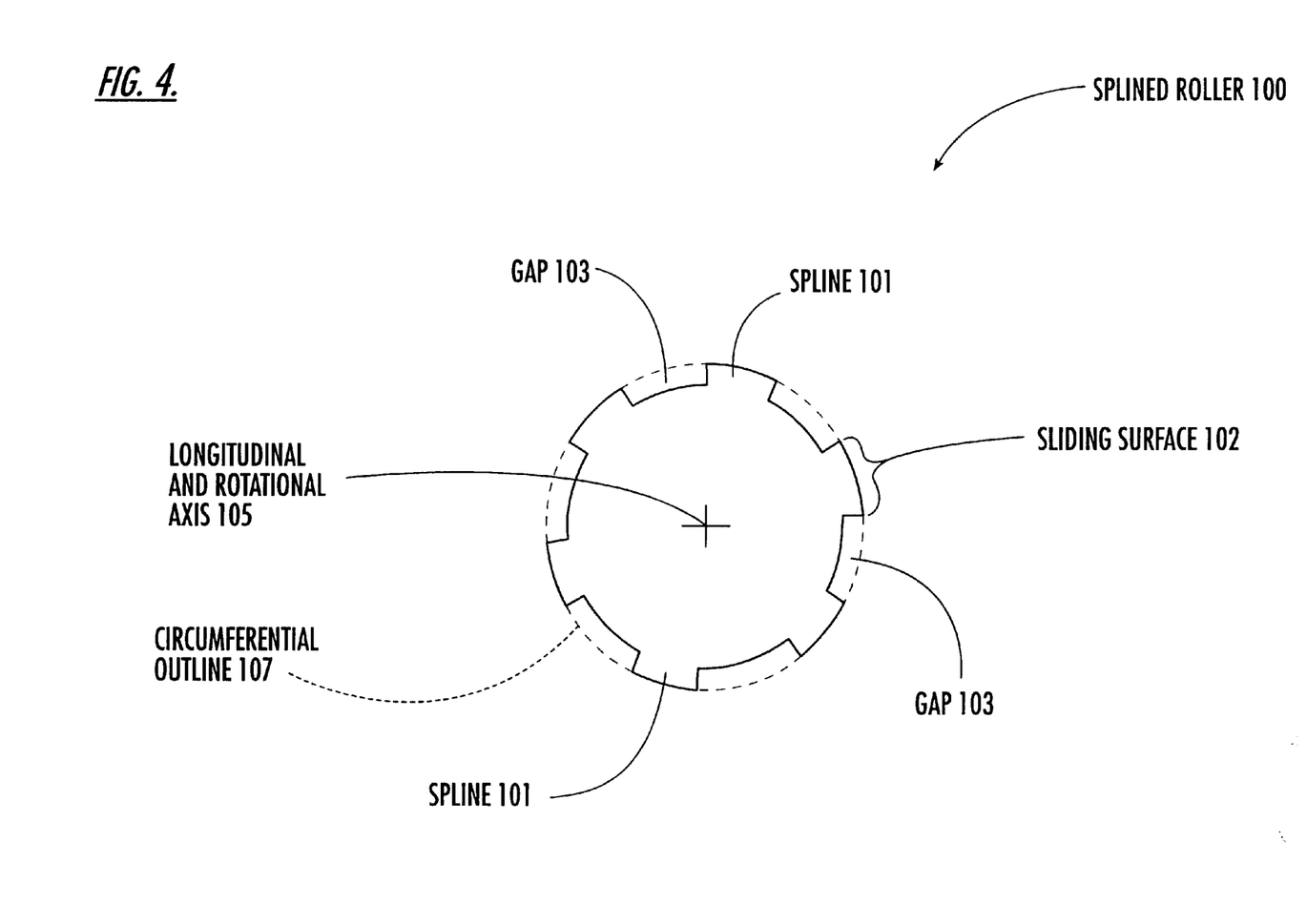
FIG. 4 is a transverse cross-sectional view of one embodiment of a splined roller 100.
Figure 5:
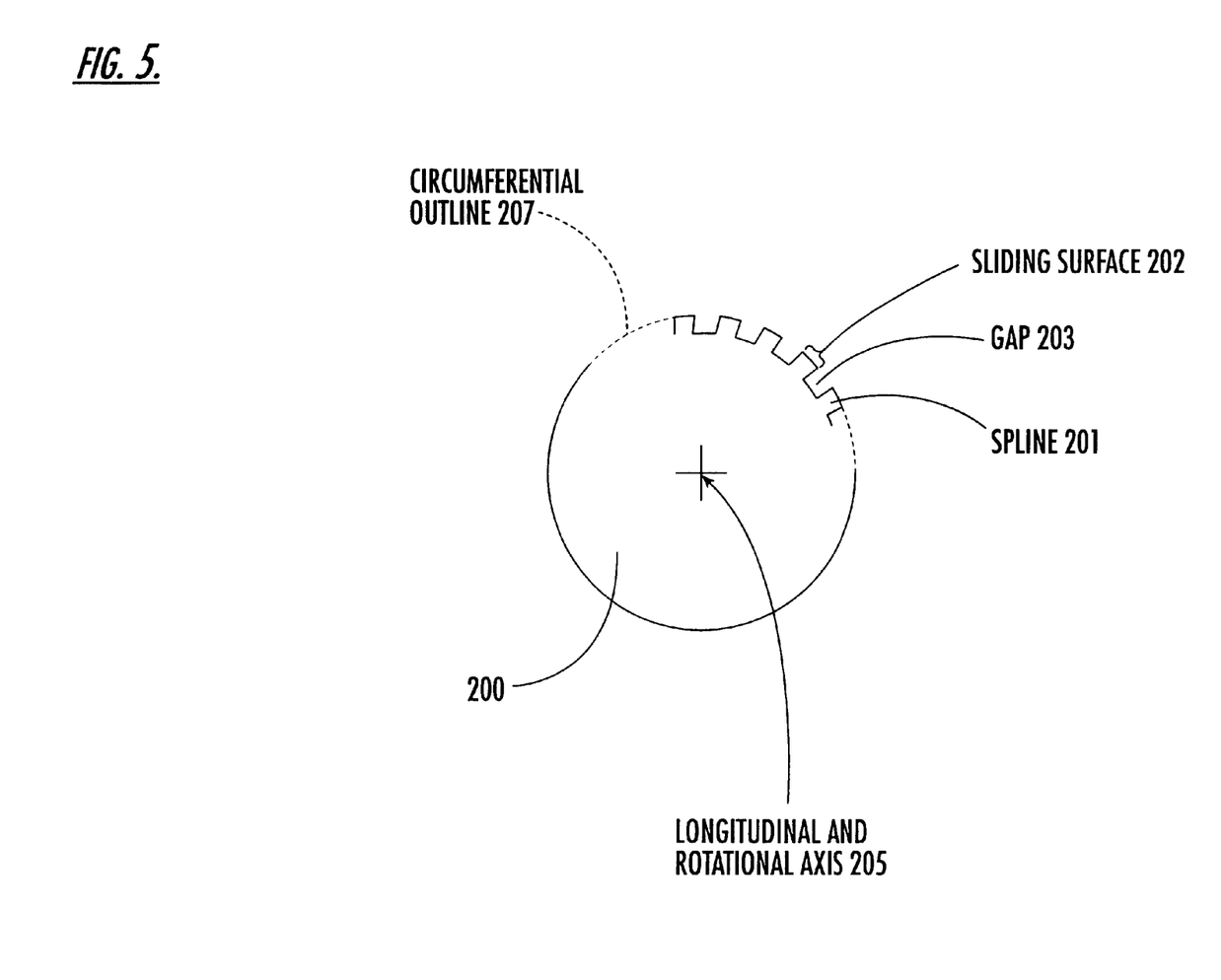
FIG. 5 is a transverse cross-sectional view of an alternate splined roller 200.

The splined rollers 32 are substantially elongate and include a plurality of splines which extend the length of the rollers. Reference will be made later to FIGS. 4 and 5 for details on the transverse cross sections of various splined rollers.

Figure 2:
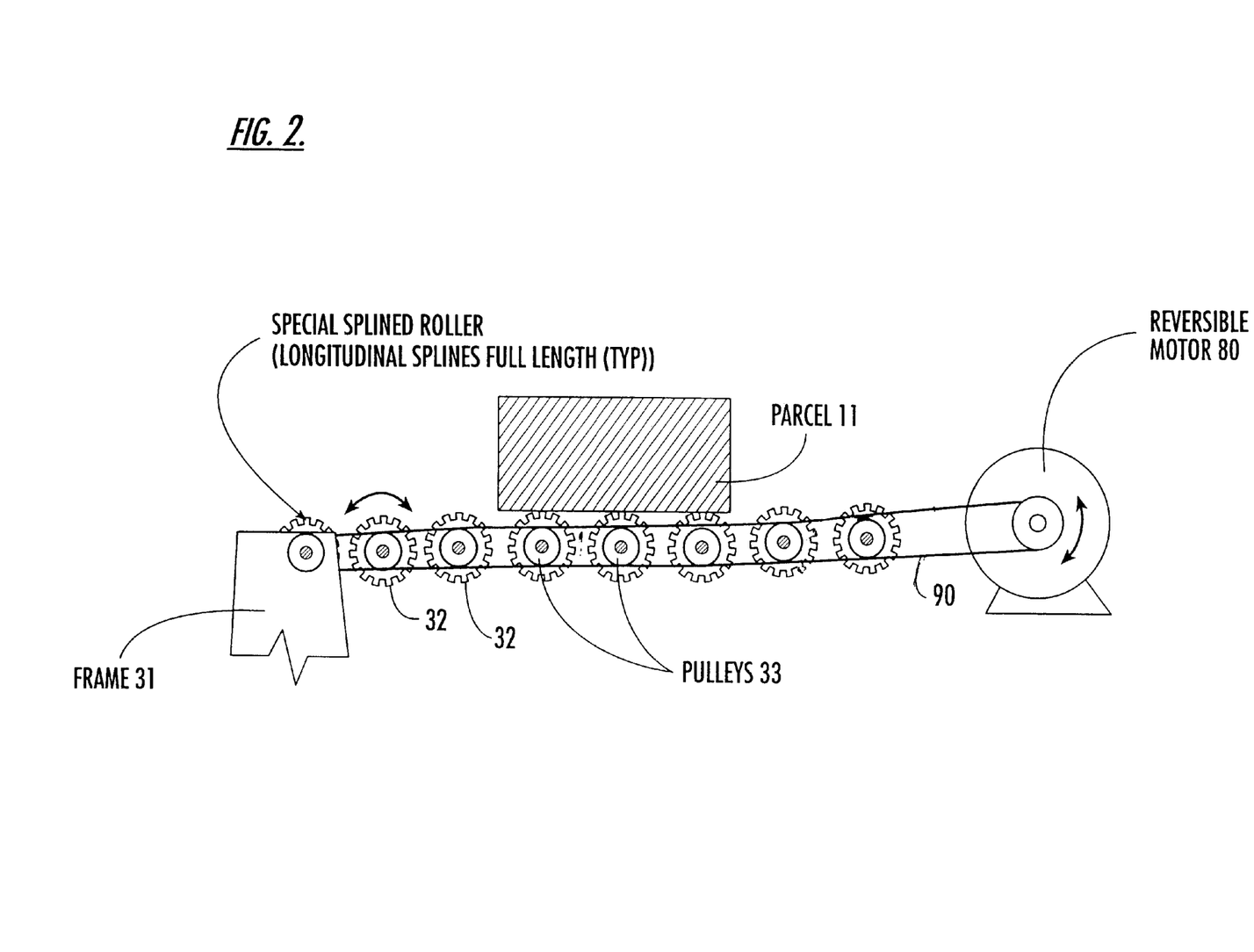
FIG. 2 is a end illustrative view (viewed along the longitudinal axes of the rollers 32) illustrating the interaction of the splined rollers 32 with a parcel 11 supported thereby, with the splined rollers 32 driven by a reversible motor 80.

The splined rollers 32 are configured to rotate about their longitudinal axes, such that each roller 32 rotates at the substantially the same speed and direction as the others. As shown in FIG. 2 the splined rollers 32 are mounted relative to the discharge station frame 31 by use of conventional bearings such as known in the art. The splined roller drive pulleys 33 are mounted substantially rigidly relative to splined rollers 32 and are configured to rotate therewith.

Figure 6:
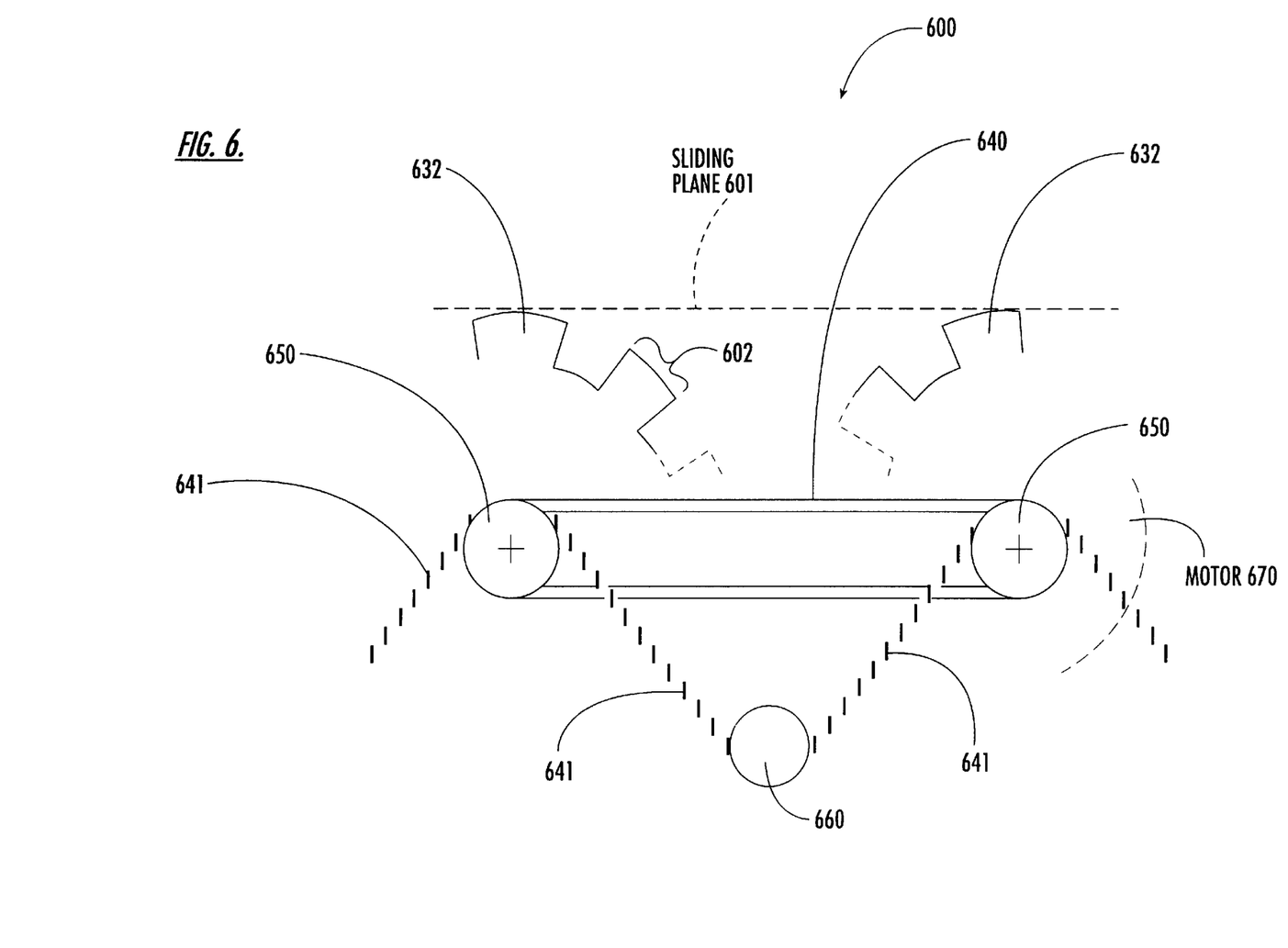
FIG. 6 is an illustrative view of a nonsynchronzied drive configuration 600.
Figure 7:
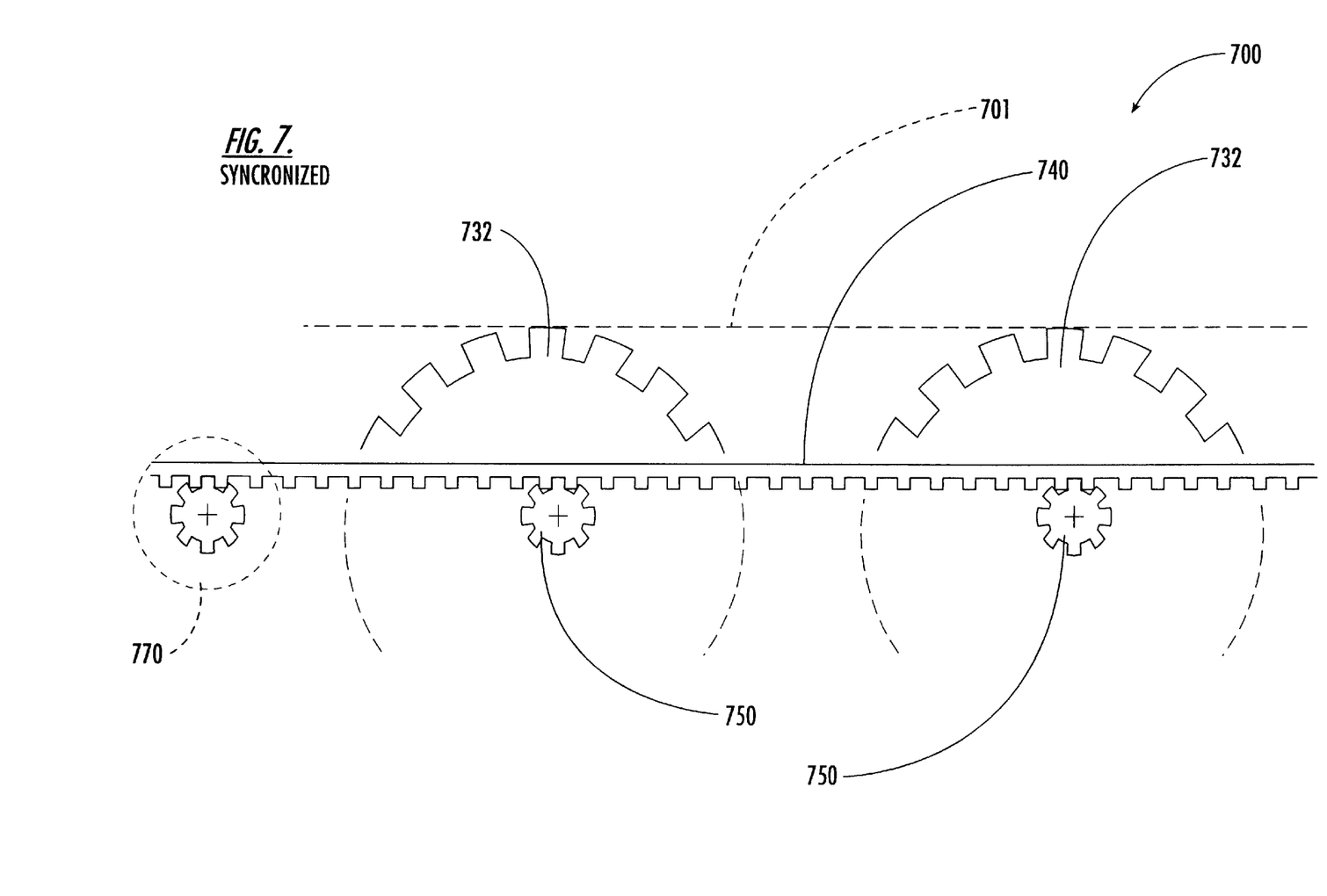
FIG. 7 is a an illustrative view of a synchronized drive configuration 700.

Reference is now made to FIGS. 6 and 7. It should be understood that the present invention contemplates the use of synchronized or nonsynchronized splined rollers. If perfect synchronization and a known start orientation are not needed, it should be understood that simple smooth belts such as 640 or 641 and pulleys such as 650 or 660 could be used with a simple reversible drive motor 670. Under such a configuration, a variety of belt paths could be used as shown in solid line as 640, in dotted line as 641, or as otherwise known in the art.

Although the splined rollers in FIG. 6 are not necessarily synchronized, they nevertheless define an inclined sliding plane 601 by combination of their upwardmost sliding surfaces 602, upon which the parcels may slide downwardly.

Should the rollers be synchronized, suitable synchronizing means can be used, such as but not limited to the configuration shown in FIG. 7. In the FIG. 7 configuration, a cogged belt 740 is used with corresponding cogged pulleys 750 to synchronize the splined rollers 732 together. By the use of synchronizing means known in the art such as by a stepper drive motor 770 the splined rollers 732 can be oriented as to desired when in their neutral positions. Necessary idler rollers for maintaining the cogged engagement are not shown for purposes of simplicity.

Roller Dimensions and Geometry

Reference is now made to FIG. 4 in order to discuss the geometry of one particular splined roller embodiment 100 which can be used as a roller 32 in, for example, the FIG. 1 configuration.

FIG. 4 is a transverse cross-sectional view of a splined roller 100. In the embodiment shown, the cross section is substantially constant along the length of the elongate roller. The roller 100 includes a plurality of radially-extending splines 101, which are spaced apart to define intermediate gaps 103. Each spline 101 defines a sliding surface 102, which lies along the circumferential outline 107 of the roller 100, and extends to and includes the corners.

Although the dimensions of the rollers can vary upon the application and should not be construed as limiting, one embodiment includes the use of a roller which has a 3 inch outer diameter with splines (and the gaps between splines) being ¼ inches wide, and the height of the splines being ⅛ inches high.

It should be understood that the configuration shown contemplates a circumferential outline which is shaped as a right cylinder, and thus the sliding surfaces are arcuate and concave. However, the invention likewise contemplates the use of rollers which define in "flat" (not outwardly curved) surfaces, such as shown in FIG. 5, and even contemplates the possibility of inwardly-curving or "convex" shapes.

Referring now to FIG. 5, again the splined roller 200 includes splines 201, sliding surfaces 202, gaps 203, a longitudinal and rotational axis 205, and a generally circumferential outline 107. However, the splines 201 and gaps 203 are relatively smaller and the sliding surfaces are substantially flat.

When the splined rollers 32 are in place, their sliding surfaces are configured such that a sliding plane is defined by at least two of the sliding surfaces.

For example, FIG. 6 shows a sliding plane 601 defined by the two surfaces 632 shown. FIG. 7 shows a sliding plane 701 defined by the two surfaces 732 shown.

Figure 3:
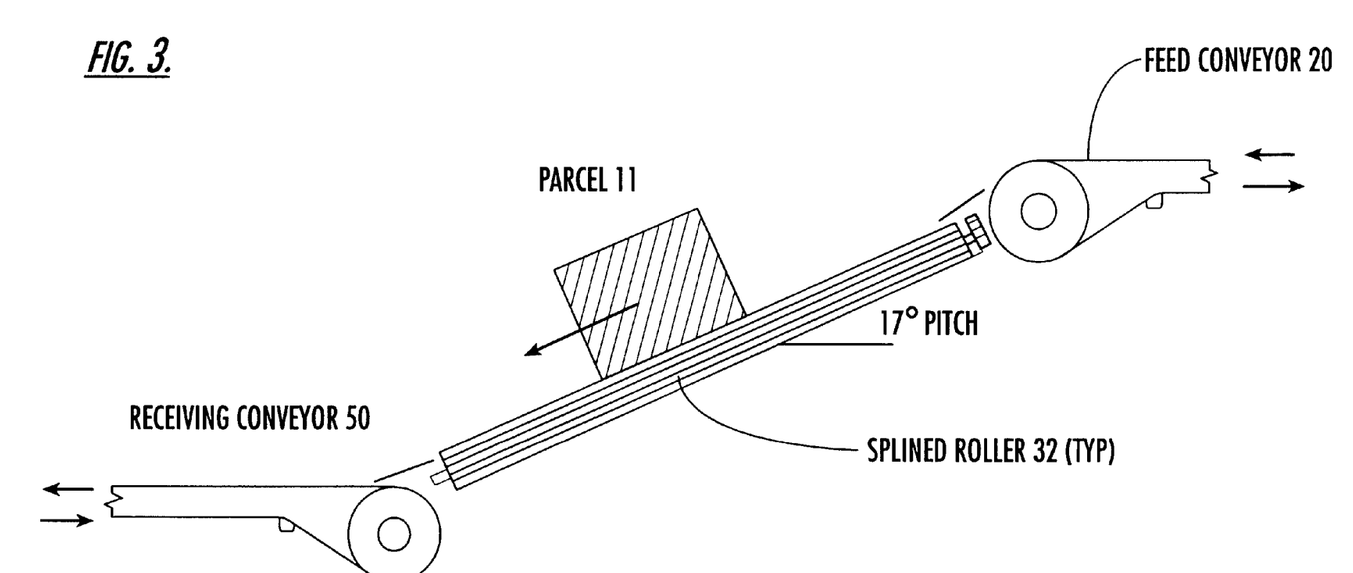
FIG. 3 is a side elevational view of a portion of the discharge station 10 according to the present invention, illustrating a parcel 11 sliding down the inclined path defined by the splined rollers 32. In this configuration, the inclination can be 170.

It should be understood that although the rollers 32 of FIGS. 1–3 are shown as all having a substantially right cylindrical circumferential profile, such a profile could instead be tapered, or even outwardly bulging or necking inwardly from its middle portion.

The Motor and Drive Assembly

Referring now generally to all the figures. The reversible drive motor 80 and drive assembly 90 are conventional and as known in the art, and can be selected as desired to perform the functions of commonly rotating the splined rollers 32. For example, the drive motor could be an AC or DC motor, could be a stepper motor, and could include necessary step-down gearing if needed.

The Receiving Stations

The receiving stations 50, 60, and 70 shown in FIG. 1 are as known in the art, and can include but are not limited to roller or other conveyors for removing the parcels to remote locations, or bins or other storage containers for retaining the parcels for eventual pickup. In the embodiment shown, the central receiving station 50 is part of a main conveyor line and the outer (a.k.a. "side") receiving stations 60 and 70 are secondary, less used, conveyors.

The first and second slide chutes 61, 71, are one important part of the invention, in that they "catch" the parcels as they are discharged sidewardly from the neutral conveying path, and guide the parcels to their corresponding receiving station 60, 70. These chutes 61, 71, may be of various shapes and configurations as known in the art, but may include an outer retaining lip to contain packages or other articles which may be otherwise discharged too far sidewardly.

Alternates

The splines could always be commonly oriented or they could be random.

The rollers could be self-powered in order to facilitate prompt installation and removal, in order to reduce downtime during repair.

If desired, a single "top" spline can be used for each roller, which always returns to the "top" position prior to accepting parcels. Such a top spline could have special characteristics such as sliding characteristics to facilitate particularly good parcel sliding.

Control and Operation

The sortation chute assembly 10 of FIGS. 1–3 can be controlled by means known in the art to allow parcels to slide straight down along a central path substantially parallel to the longitudinal axes of the splined rollers to central receiving stations 50, or alternately to discharge the parcels (a.k.a. packages) sidewardly from the neutral conveying path to one of the two side discharge stations 60, 70 which are located on opposite sides of the neutral conveying path.

It should be understood that typically such a sortation chute will be part of a conveying path in which parcels which are not to be discharged from the main conveying path are allowed to pass through the discharge station 10 along its neutral conveying path. However, if desired, parcels can be discharged to either side of said neutral conveying path to one of two side discharge stations.

Generally described, the sortation chute assembly 10 is configured to allow parcels 11 to pass from its input location from the feed conveyor 20 to its center output location 50 by allowing the parcels 11 to slide down the plurality of inclined, parallel, elongate splined rollers 32, which are rotatably mounted about their longitudinal axes. By selectively and commonly rotating the rollers 32, while the packages are atop the inclined bed of rollers, the parcels can be selectively discharged to either side of the neutral inclined conveying path to one of two discharge locations.

The timing of such rotation relative to package entry can differ depending on the situation. It could be before, simultaneous, or after the packages contact the roller bed.

However, it is believed that the timing should be such that rotation begins after the packages have contacted and start to slide down the inclined path. This can reduce the chances of the package being "kicked" back upstream.

The speed of the rotation of the splined rollers can vary upon the particular situation and types of packages being handled, and one skilled in the art will understand the need for adaptation of such speeds for particular needs. However, it should be noted that excessive speeds can result in a loss of "bite" on the packages by the splines, and should be avoided.

Conclusion

Therefore it may be seen that the present invention overcomes deficiencies in the art by providing a sortation chute assembly which include side discharge features, said assembly being reliable and also being simple to operate, maintain, and service.

While this invention has been described in specific detail with reference to the disclosed embodiments, it will be understood that many variations and modifications may be effected within the spirit and scope of the invention as described in the appended claims.

I claim:

1. A conveying system sortation apparatus for accepting articles from at least one source and distributing said articles to one of a plurality of output locations along either a neutral conveying path or a side discharge path, said conveying system comprising:

an inclined conveyor having an upper end and a lower end, said inclined conveyor comprised of a plurality of inclined splined rollers, each of said splined rollers having longitudinal axes substantially parallel to said neutral conveyor path; and a device for selectively rotating said inclined splined rollers so said articles can either slide down said splines of said inclined splined rollers along said neutral conveyor path to said lower end, or alternately be ejected by roller rotation to one side of said path along said side discharge path.

2. The apparatus as claimed in claim 1, further comprising an infeed conveyor for delivering articles to said inclined conveyor.

3. The discharge station apparatus as claimed in claim 1, wherein said rotation of said splined rollers is common rotation.

4. The discharge station apparatus as claimed in claim 1, wherein said splines define arcuate sliding surfaces.

5. The discharge station apparatus as claimed in claim 1, wherein said splines define flat sliding surfaces.

6. The apparatus as claimed in claim 1, wherein said device for selectively rotating said inclined rollers is configured to discharge said article to either side of said neutral conveying path.

7. The discharge station apparatus as claimed in claim 6, wherein said rotation of said splined rollers is common rotation.

8. A discharge station apparatus configured for accepting an article from one input location and distributing it to one of a plurality of destination locations, said discharge station apparatus comprising:

a frame;

a plurality of inclined splined rollers each including a plurality of longitudinal splines, each spline defining an outwardly-directed sliding surface;

a plurality of splined roller mounts attached relative to said frame, each of said mounts configured for mounting each of said rollers in an inclined orientation such that at least two of said sliding surfaces define a sliding path surface for said article and said rollers can rotate about their longitudinal axis; and     a roller rotation device for selectively allowing said plurality of splined rollers to remain in stationary positions or to alternately rotate said splined rollers about their longitudinal axes, such that said articles may be conveyed down said rollers by a sliding action when said rollers are stationary, or alternatively may be discharged sidewardly from said rollers by said rotation.

9. The apparatus as claimed in claim 8, further comprising an infeed conveyor for delivering articles to said inclined conveyor.

10. The discharge station apparatus as claimed in claim 8, wherein said rotation of said splined rollers is common rotation.

11. The apparatus as claimed in claim 8, wherein said roller rotation device for selectively rotating said inclined rollers is configured to discharge said article to either side of said rollers.

12. The discharge station apparatus as claimed in claim 11, wherein said rotation of said splined rollers is common rotation.

13. A article conveying method of accepting articles of a particular location and selectively conveying said articles to one of a plurality of destinations, said article conveying method comprising the steps of:

A) providing a article conveying path including an inclined path portion defined by a bed of inclined splined rollers, each roller including a plurality of longitudinal splines, each spline defining an outwardly-directed sliding surface;

B) conveying a first article along said path until said article is situated atop said bed of inclined splined rollers;

C) allowing said article to slide down said bed of inclined splined rollers while maintaining said rollers in a stationary mode, such that said article slides along a neutral path down to the lower end of said bed of inclined splined rollers to a first destination;

D) providing a second article along said path until said second article is situated atop said bed of inclined splined rollers; and     E) rotating said rollers in a common rotational direction such that said second article is discharged sidewardly and off of said neutral path to a second destination.

14. The method as claimed in claim 13, wherein in step E, said rollers are initially stationary when said article contacts said rollers, and said rollers begin rotation after said article contacts said rollers.

15. The method as claimed in claim 13, wherein in step E, said rollers are already rotating at the time the article begins contact with the rollers.

16. The apparatus as claimed in claim 13, wherein in step E, said rollers are driven from a common location.

17. The apparatus as claimed in claim 13, wherein in step E, each of plurality of rollers is driven by an internal powered roller.

18. The method as claimed in claim 13, wherein said common rotational direction in step E is a first rotational direction, and further comprising the steps of:

F) subsequent to step E, providing a third article atop said bed of inclined splined rollers; and     G) rotating said rollers in a second rotational direction opposite to said first rotational direction such that said second article is discharged sidewardly and off or said neutral path to a second destination.

19. The method as claimed in claim 18, wherein in step E, said rollers are initially stationary when said article contacts said rollers, and said rollers begin rotation after said article contacts said rollers.

20. The method as claimed in claim 18, wherein in step E, said rollers are already rotating at the time the article begins contact with the rollers.

* * * * *

UNITED STATES PATENT AND TRADEMARK OFFICE
CERTIFICATE OF CORRECTION

PATENT NO.   : 6,276,508 B1
DATED        : August 21, 2001
INVENTOR(S)  : Bonnet It is certified that error appears in the above-identified patent and that said Letters Patent is hereby corrected as shown below:

<u>Title page,</u>
Item [56], References Cited, U.S. PATENT DOCUMENTS,
Line 9, "3,737,736" should read -- 3,747, 736 --.

<u>Column 7,</u>
Line 48, "A" should read -- An --.

<u>Column 8,</u>
Line 1, "a" should read -- an --;
Line 31, after "of", first occurrence, insert -- the --;
Line 41, "or" should read -- of --.

Signed and Sealed this

Fifth Day of March, 2002

*Attest:*

JAMES E. ROGAN
*Director of the United States Patent and Trademark Office*

*Attesting Officer*